United States Patent
Schalk et al.

(10) Patent No.: US 11,292,202 B2
(45) Date of Patent: Apr. 5, 2022

(54) APPLYING AN ADDITIVE MANUFACTURING AGENT BASED ON ACTUAL PLATFORM DISPLACEMENT

(71) Applicant: HEWLETT-PACKARD DEVELOPMENT COMPANY, L.P., Spring, TX (US)

(72) Inventors: Wesley R Schalk, Vancouver, WA (US); Arthur H Barnes, Vancouver, WA (US); Morgan T Schramm, Vancouver, WA (US); Xin Cheng, Vancouver, WA (US); Miguel Angel Lopez Alvarez, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/607,826

(22) PCT Filed: Jun. 18, 2018

(86) PCT No.: PCT/US2018/038011
§ 371 (c)(1),
(2) Date: Oct. 24, 2019

(87) PCT Pub. No.: WO2019/245519
PCT Pub. Date: Dec. 26, 2019

(65) Prior Publication Data
US 2021/0331411 A1    Oct. 28, 2021

(51) Int. Cl.
*G05B 19/042*    (2006.01)
*B29C 64/393*    (2017.01)
(Continued)

(52) U.S. Cl.
CPC .......... *B29C 64/393* (2017.08); *B29C 64/232* (2017.08); *B33Y 30/00* (2014.12);
(Continued)

(58) Field of Classification Search
CPC ... B29C 64/393; B29C 64/232; B29C 64/165; B33Y 30/00; B33Y 50/02; G05B 19/042; G05B 2219/23287
See application file for complete search history.

(56) References Cited

U.S. PATENT DOCUMENTS

| | | | |
|---|---|---|---|
| 6,200,646 B1 * | 3/2001 | Neckers | B29C 64/129 427/510 |
| 7,497,977 B2 | 3/2009 | Nielsen et al. | |

(Continued)

FOREIGN PATENT DOCUMENTS

| | | |
|---|---|---|
| CN | 206544318 U | 10/2017 |
| DE | 102014203710 B3 | 5/2015 |

(Continued)

*Primary Examiner* — Rocio Del Mar Perez-Velez
*Assistant Examiner* — Alicia M. Choi
(74) *Attorney, Agent, or Firm* — HP Inc. Patent Department (57) ABSTRACT

In one example, a control process for an additive manufacturing machine includes displacing a platform, measuring the actual displacement of the platform, determining that the actual displacement varies from a nominal displacement, and determining an amount of an agent to be applied to build material layered on the displaced platform based on the determined variation.

12 Claims, 10 Drawing Sheets

(51) Int. Cl.
  *B33Y 30/00*   (2015.01)
  *B33Y 50/02*   (2015.01)
  *B29C 64/232*  (2017.01)

(52) U.S. Cl.
  CPC ............ *B33Y 50/02* (2014.12); *G05B 19/042* (2013.01); *G05B 2219/23287* (2013.01)

(56) References Cited

U.S. PATENT DOCUMENTS

| | | | | |
|---|---|---|---|---|
| 2005/0167872 A1* | 8/2005 | Tsubaki | ............... | B29C 64/165 |
| | | | | 264/113 |
| 2014/0271328 A1* | 9/2014 | Burris | ................... | B33Y 10/00 |
| | | | | 419/53 |
| 2015/0099025 A1* | 4/2015 | Spalt | ...................... | B33Y 30/00 |
| | | | | 425/166 |
| 2016/0332376 A1* | 11/2016 | Ramirez Muela | ..... | B33Y 70/00 |
| 2016/0342149 A1 | 11/2016 | Napadensky | | |
| 2017/0028633 A1* | 2/2017 | Evans | ................... | B29C 64/106 |
| 2017/0050386 A1* | 2/2017 | Houben | ................. | B29C 64/35 |
| 2017/0072637 A1 | 3/2017 | Yanazume et al. | | |
| 2017/0144379 A1* | 5/2017 | Sung | ..................... | B29C 64/393 |
| 2017/0151722 A1 | 6/2017 | Prasad et al. | | |
| 2017/0182711 A1* | 6/2017 | Ederer | .................... | B28B 1/001 |
| 2018/0111195 A1 | 4/2018 | Romano et al. | | |
| 2018/0186094 A1* | 7/2018 | Yang | ..................... | B33Y 99/00 |
| 2019/0099942 A1* | 4/2019 | Thompson | ............. | B33Y 10/00 |
| 2019/0232371 A1* | 8/2019 | Ladewig | ................ | B33Y 10/00 |
| 2019/0283183 A1* | 9/2019 | Koch | ..................... | B33Y 30/00 |
| 2019/0351614 A1* | 11/2019 | Nolet | ...................... | G01B 21/02 |
| 2020/0108558 A1* | 4/2020 | Vermeulen | ............ | B29C 64/209 |
| 2020/0238625 A1* | 7/2020 | Champion | ............ | B29C 64/393 |

FOREIGN PATENT DOCUMENTS

| | | |
|---|---|---|
| WO | WO2016186613 A1 | 11/2016 |
| WO | WO-2017125128 A1 | 7/2017 |
| WO | WO2017194126 A1 | 11/2017 |
| WO | WO2018017084 A1 | 1/2018 |
| WO | WO2018017099 A1 | 1/2018 |
| WO | WO2018022034 A1 | 2/2018 |

\* cited by examiner

APPLYING AN ADDITIVE MANUFACTURING AGENT BASED ON ACTUAL PLATFORM DISPLACEMENT

BACKGROUND

Additive manufacturing machines produce three-dimensional objects by building up layers of material. Some additive manufacturing machines are commonly referred to as "3D printers." 3D printers and other additive manufacturing machines convert a digital representation of an object into the physical object. The digital representation may be processed into slices each defining a layer or layers of build material to be formed into the object.

DRAWINGS

The same part numbers designate the same or similar parts throughout the figures.

DESCRIPTION

In some additive manufacturing machines, powdered build materials are used to form a solid object. Build material in each of many successive layers is treated with a liquid fusing agent and then irradiated to fuse the build material in a pattern corresponding to each digital object slice. Thus, the object is manufactured layer by layer according to the digital slices. The actual thickness of each layer of build material may vary from a nominal thickness, for example due to inaccuracies in the build platform lift system. A deviation in layer thickness from the nominal thickness can result in incorrect fusing agent concentrations. Thin layers of build material may have too high a concentration of fusing agent and thick layers of build material may have too low a concentration. Incorrect concentrations of fusing agent can cause defects in the manufactured object. The concentration of detailing, coloring, and other liquid agents used in some additive manufacturing processes may be similarly affected by variations in layer thickness.

A new technique has been developed to help compensate for variations in the thickness of a layer of build material. Examples use an encoder or other measuring device to measure the actual distance the build platform is lowered for each layer of build material. For those additive manufacturing machines in which the next layer of build material fills the void formed when the platform is lowered, the actual distance the platform is lowered corresponds to the actual thickness of the next layer of build material. Accordingly, the amount of fusing agent to be applied to each layer may be adjusted in real time based on the measured displacement of the platform to compensate for any variation in the actual layer thickness from the nominal thickness. The machine controller may be programmed to determine, each time the platform is lowered, if the measured platform displacement is different from the nominal displacement. In one example, if the measured displacement is too high or too low compared to the nominal displacement, then the controller adjusts the amount of fusing agent to be applied to the build material in the next layer to keep the amount of agent applied per unit volume of build material constant for each of the layers of build material.

The amount of detailing, coloring, and any other agents to be applied to the next layer may be similarly adjusted. Also, examples are not limited to liquid agents or powdered build materials but may be used to modulate other forms of agents applied to other fusible build materials.

These and other examples described herein illustrate but do not limit the scope of the patent, which is defined in the Claims following this Description.

As used in this document, "and/or" means one or more of the connected things; a "fusing agent" means a substance that causes or helps cause a build material to sinter, melt, bind, cure or otherwise fuse; a "detailing agent" means a substance that inhibits or prevents or enhances fusing a build material, for example by modifying the effect of a fusing agent and/or cooling the build material; and a "memory" means any non-transitory tangible medium that can embody, contain, store, or maintain information and instructions for use by a processor and may include, for example, circuits, integrated circuits, ASICs (application specific integrated circuits), hard drives, random access memory (RAM), read-only memory (ROM), and flash memory.

Figure 1:
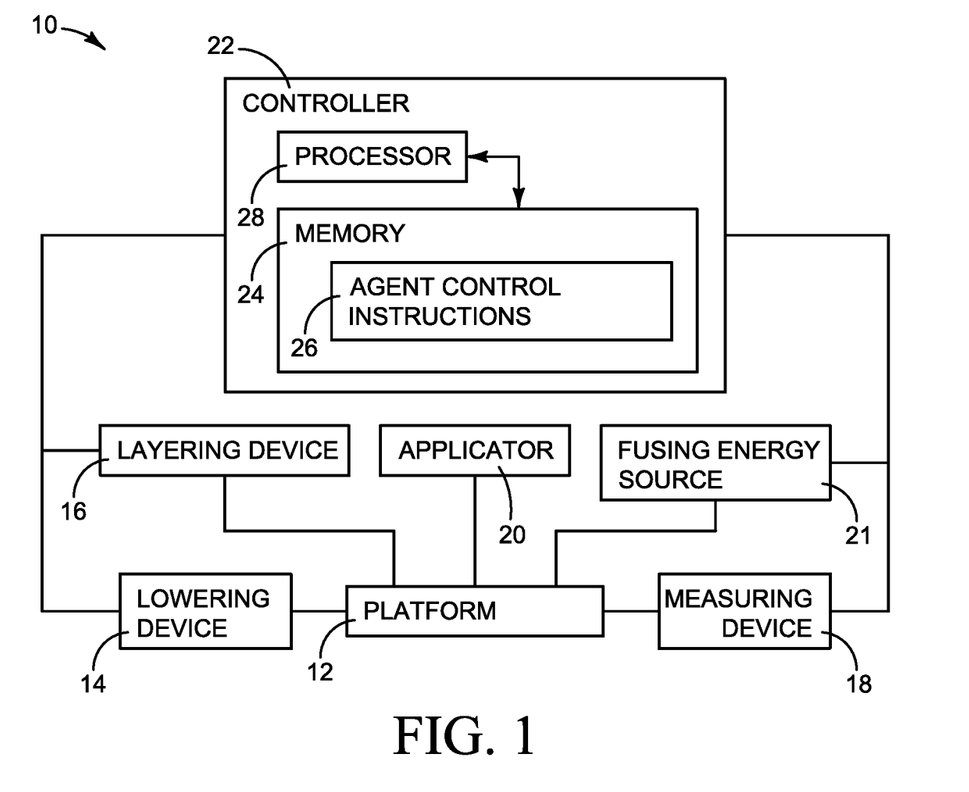
FIG. 1 is a block diagram illustrating one example of an additive manufacturing machine that includes a controller programmed to adjust agent amount based on actual platform displacement.

FIG. 1 is a block diagram illustrating one example of an additive manufacturing machine that includes a controller programmed to adjust agent amount based on actual platform displacement. Referring to FIG. 1, an additive manufacturing machine 10 includes a platform 12 to support build material during manufacturing, a lowering device 14 to lower platform 12 incrementally to accommodate a succession of layers of build material, a layering device 16 to layer build material on to platform 12, a measuring device 18 to measure an actual distance the platform is lowered, an applicator 20 to selectively apply an agent to build material on platform 12, a source of fusing energy 21 to apply fusing energy to build material on platform 12 treated with a fusing agent, and a controller 22. Controller 22 represents the processing and memory resources, programming, and the electronic circuitry and components needed to control the operative components of machine 10, and may include distinct control elements for individual machine components. In particular, controller 22 includes a memory 24 with agent control instructions 26 and a processor 28 to execute instructions 26 to cause applicator 20 to apply an amount of an agent to each of multiple successive layers of build material to keep the amount of agent applied per unit volume of build material constant for each of the layers of build material formed on platform 12.

In one example, where controller 22 receives digital data representing each slice of the object that includes a nominal amount of agent to be applied based on a nominal layer thickness, controller 22 executing instructions 26 changes the nominal amount of agent to an adjusted amount based on the measured platform displacement, so that the amount of agent applied per unit volume of build material remains constant for each layer of build material. In another example, where the object data received by controller 22 does not already include a nominal amount of agent to be applied for each slice, controller 22 executing instructions 26 determines the amount of agent to be applied to each layer of build material based on the measured platform displacement, so that the amount of agent applied per unit volume of build material remains constant for each layer of build material.

In one example, for an additive manufacturing process in which liquid fusing agents are applied with an inkjet type applicator to a powdered build material and then irradiated with fusing energy, testing indicates that the amount of fusing agent to achieve the desired fusing varies by about 1.25 times the percentage variation in the thickness of the build material layer, for thickness variations of ±25%. Thus, for example, if the thickness of the layer of build material as measured by platform displacement is 10% less than the nominal thickness, the amount of fusing agent is reduced by 12.5%. Although the relationship between variations in layer thickness and the corresponding adjustment to the amount of fusing agent may vary depending on the specific process parameters, it is expected that adjustments in the amount of fusing agent in the range of 1.2 to 1.3 times the percentage variation in the thickness of the build material layer for thickness variations of ±25% will be adequate to achieve the desired fusing in many applications of this example manufacturing process.

Controller 22 may determine the amount of agent to be applied, for example, by computing the agent amount based on the relationship between platform displacement and the corresponding amount of agent or by reference to a look up table that incorporates the relationship between platform displacement and the corresponding agent amount.

Figures 2, 3:
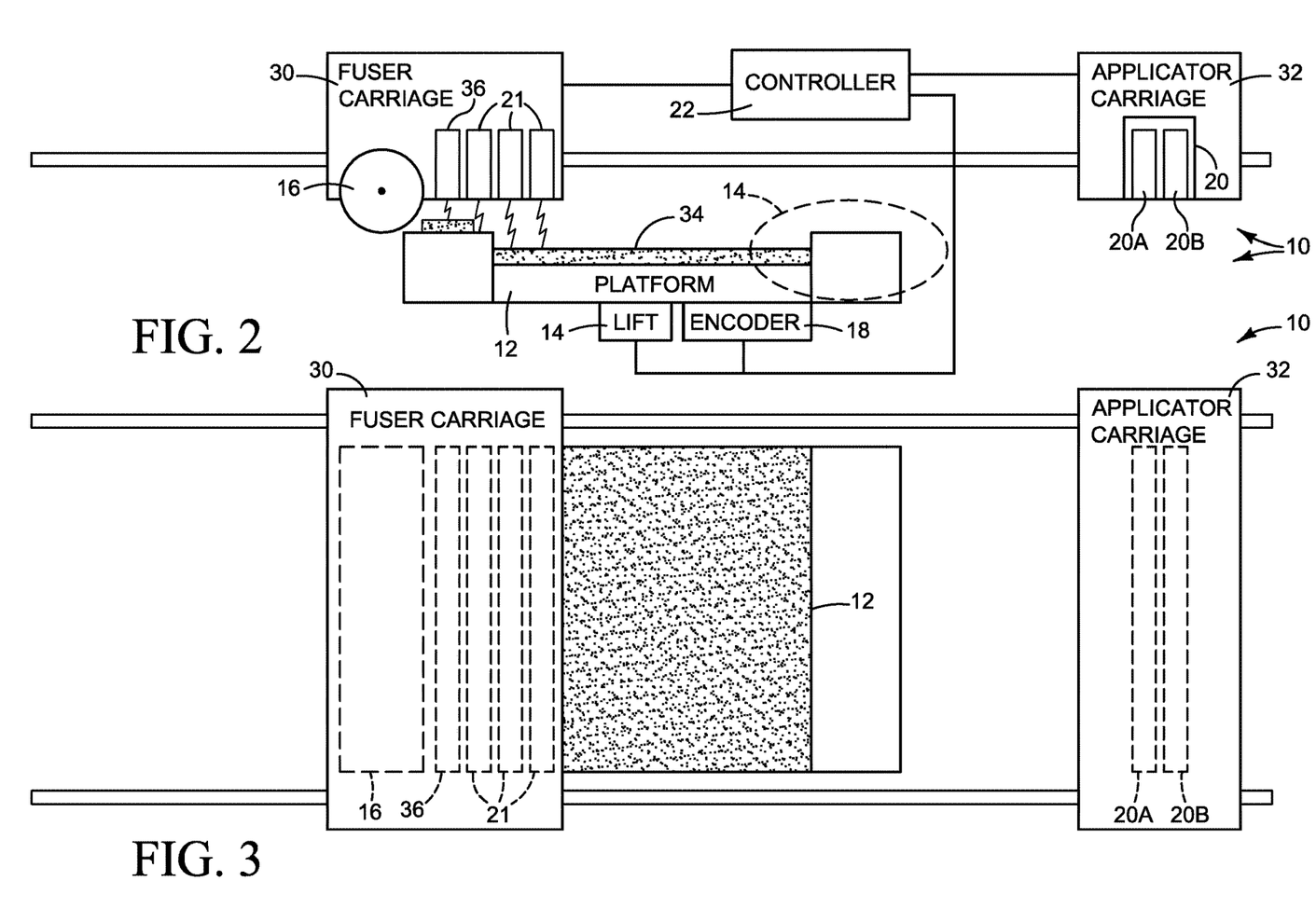
FIGS. 2-13 present a sequence of elevation and plan views illustrating an additive manufacturing machine implementing one example of agent modulation based on platform displacement.
Figure 12:
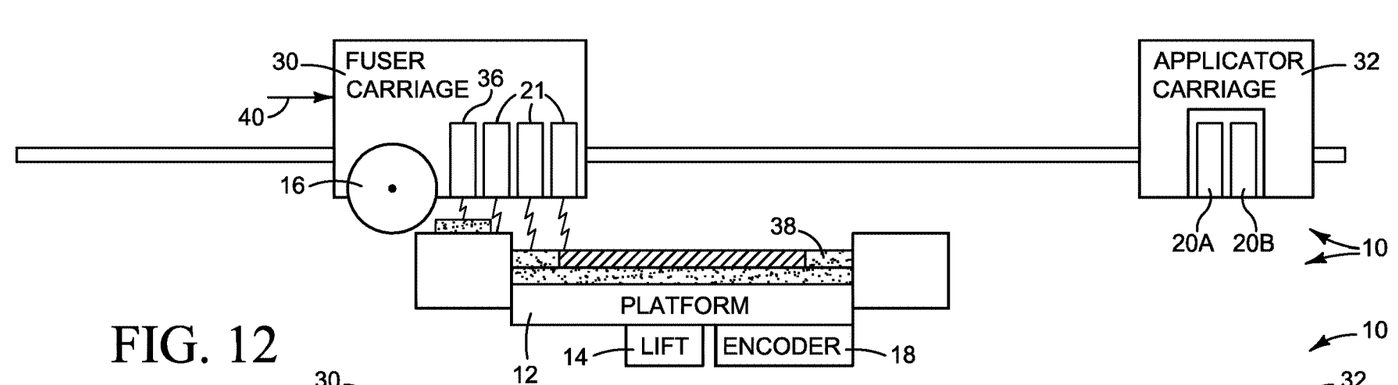
Figure 13:
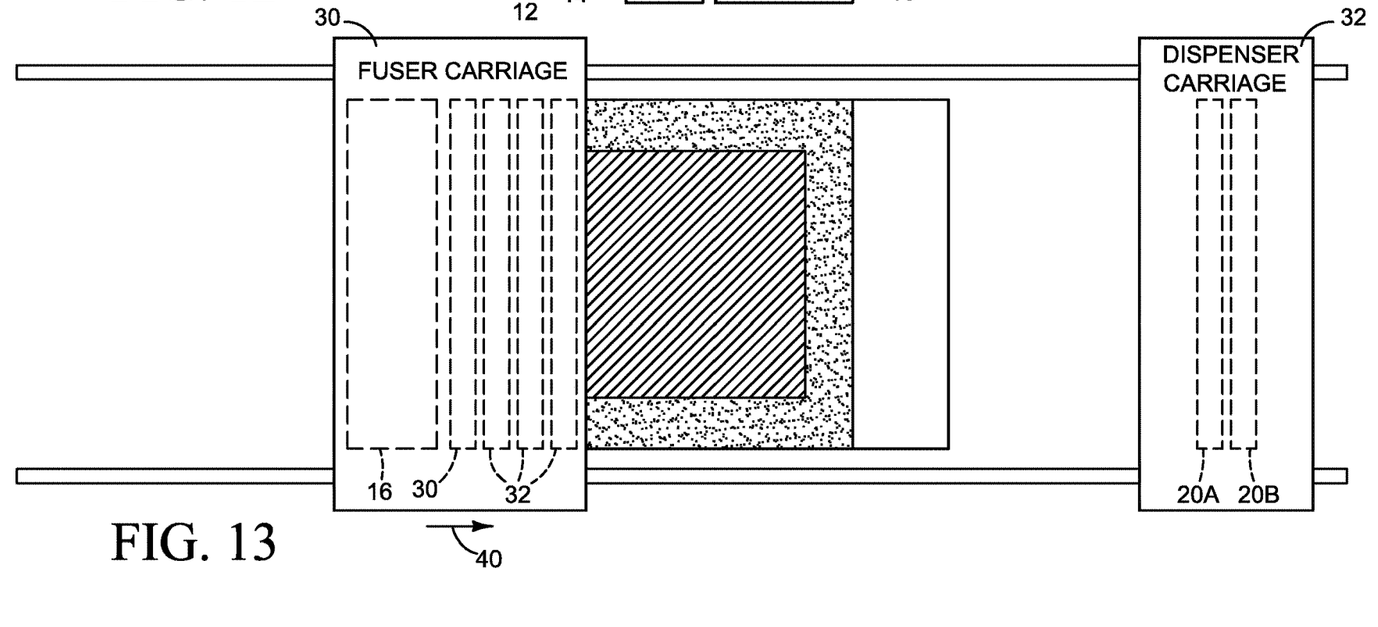
Figure 14:
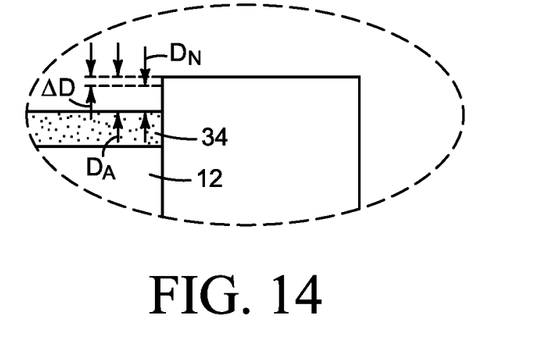
FIG. 14 is a detail view from FIG. 2.

FIGS. 2-13 present a sequence of elevation and plan views showing one example of a manufacturing process for an additive manufacturing machine 10 implementing agent modulation based on platform displacement. FIG. 14 is a detail view from FIG. 2. Referring to FIGS. 2 and 3, machine 10 includes a first, "fuser" carriage 30 and a second, "applicator" carriage 32. Carriages 30, 32 move back and forth over platform 12 at the direction of a controller 22. Controller 22 represents the processing and memory resources and the instructions, electronic circuitry and components needed to control the operative elements of machine 10. In particular, as shown in FIG. 1, controller 22 includes a memory 24 with agent control instructions 26 and a processor 28 to execute instructions 26. Controller 22 is omitted from the subsequent elevation views which show the carriages in motion.

Fuser carriage 30 carries a roller or other suitable layering device 16 to successively layer each of the many thin layers of build material 34 on to platform 12. Only two layers of build material are shown in the figures and the thickness of each layer is greatly exaggerated to better illustrate the examples shown and described. Hundreds or thousands of layers of build material a few tenths of a millimeter thick or thinner are commonly used in additive manufacturing to complete an object. Fuser carriage 30 also carries a heating lamp or other suitable heater 36 to heat unfused build material 34, and an array of fusing lamps or other suitable energy source 21 to apply fusing energy to build material 34 treated with a fusing agent. Applicator carriage 32 carries an inkjet printhead assembly or other suitable agent applicator 20 to apply a fusing agent to build material 34 on platform 12. In the example shown, applicator 20 includes a first applicator 20A to apply a fusing agent and a second applicator 20B to apply another agent, for example a detailing agent. Other agents are used in some additive manufacturing processes including, for example, coloring agents.

Additive manufacturing machine 10 also includes a lift 14 to lower and raise platform 12 and an encoder or other measuring device 18 to measure the displacement of platform 12. Controller 22 instructs lift 14 to lower platform 12 a nominal distance for each layer of build material 34. Encoder 18 senses the actual position of the lowered platform 12 as a measure of the actual distance platform 12 is displaced from its prior position. The detail view of FIG. 14 shows a difference $\Delta D$ between the nominal distance $D_N$ lift 14 is instructed to lower platform 12 for the next layer in FIG. 2 and the actual distance $D_A$ measured by encoder 18. Controller 22 determines the amount of fusing and detailing agents to be applied to the next layer based on the displacement deviation $\Delta D$ and instructs applicator 20 to apply the agents in the determined amounts. In the example shown in FIG. 14, a positive deviation $\Delta D$ means the next layer will be thicker than the nominal thickness and, accordingly, controller 22 will determine that a greater amount of agents is to be applied to the thicker next layer.

Figure 4:
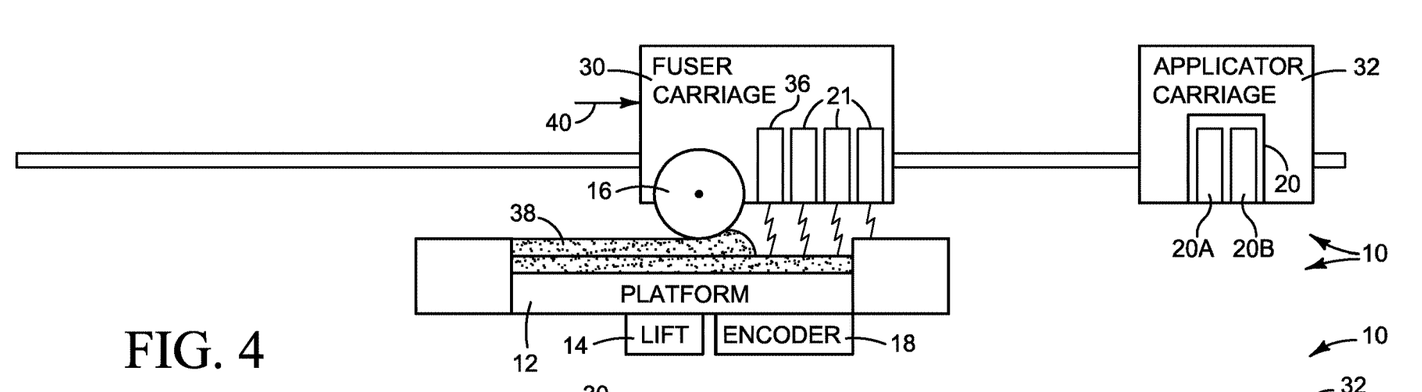
Figure 5:
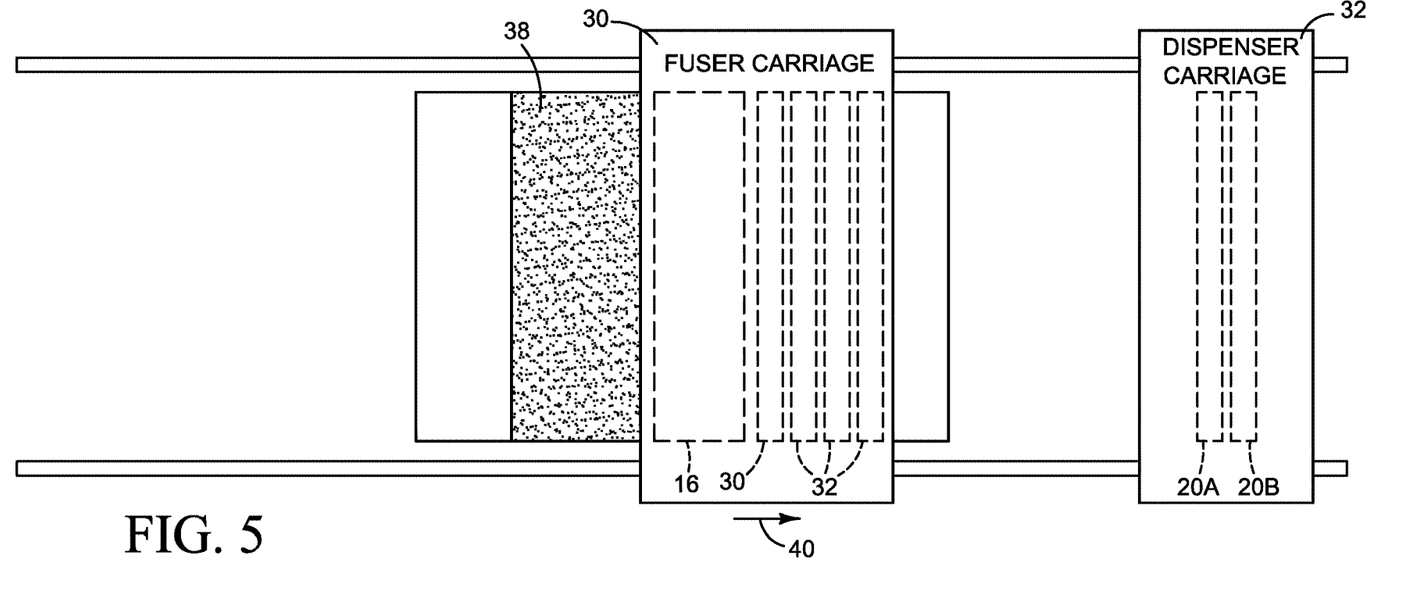
Figure 6:
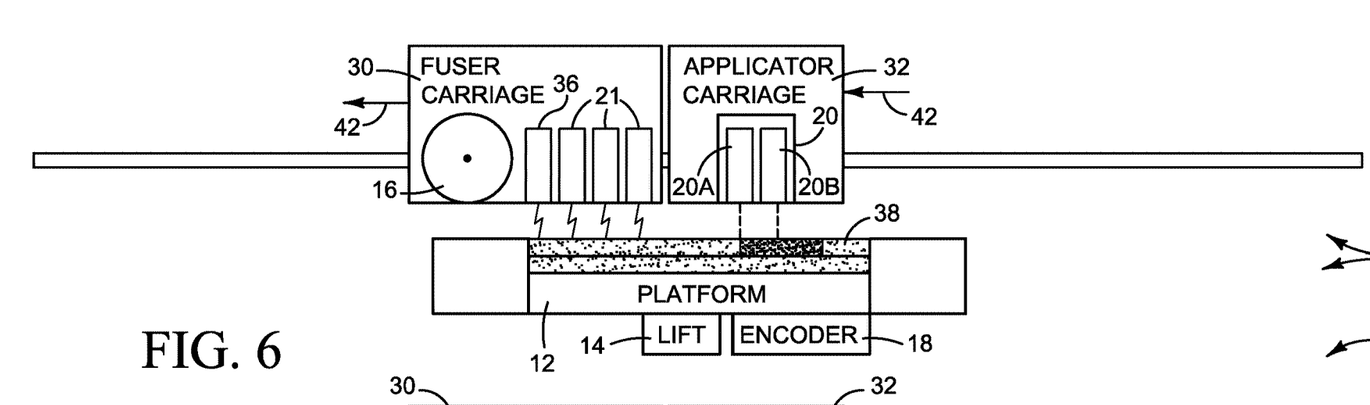
Figure 7:
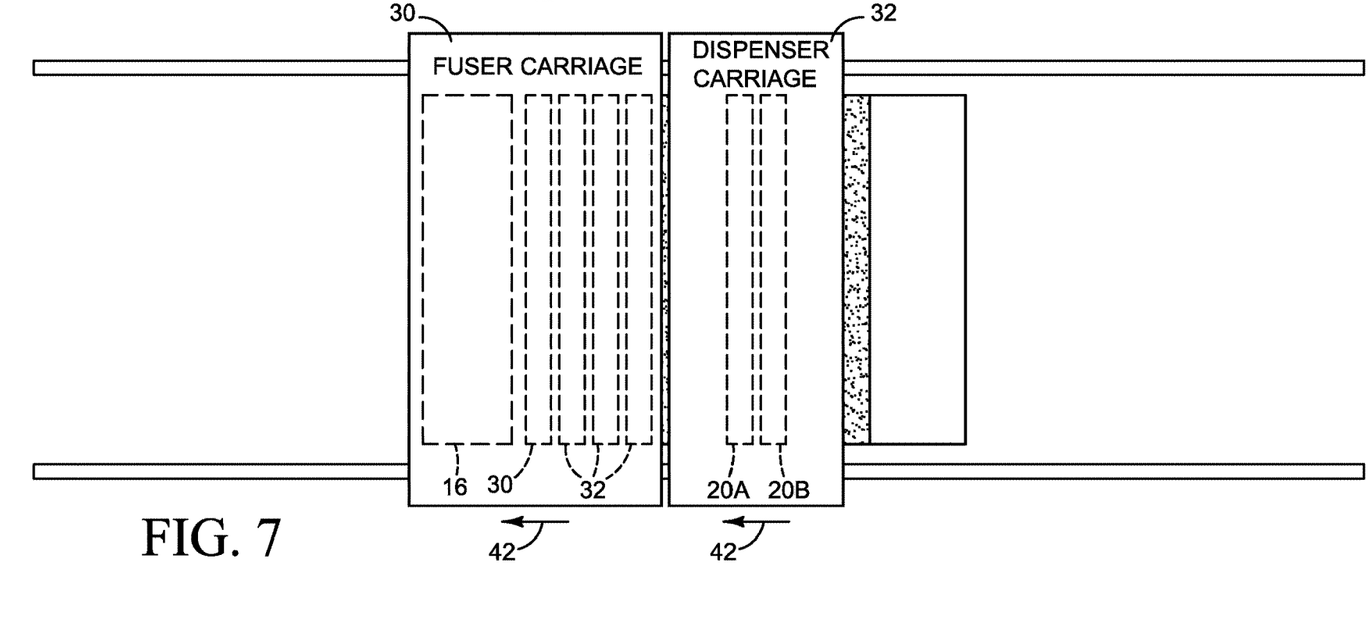

Before, during or after determining the amount of each agent to apply, controller 22 instructs fuser carriage 30 to move to the right with roller 16 deployed to layer build material 34 on to the lowered platform in a next layer 38, as shown in FIGS. 4 and 5. The direction of carriage 30 is indicated by motion arrows 40 in FIGS. 4 and 5. In FIGS. 6 and 7, applicator carriage 32 is moving to the left behind fuser carriage 30, as indicated by motion arrows 42, to apply fusing and detailing agents on to the build material in a pattern corresponding to an object slice in the amounts determined by controller 22. Build material 34 treated with an agent is depicted by dense stippling in the figures.

Figure 8:
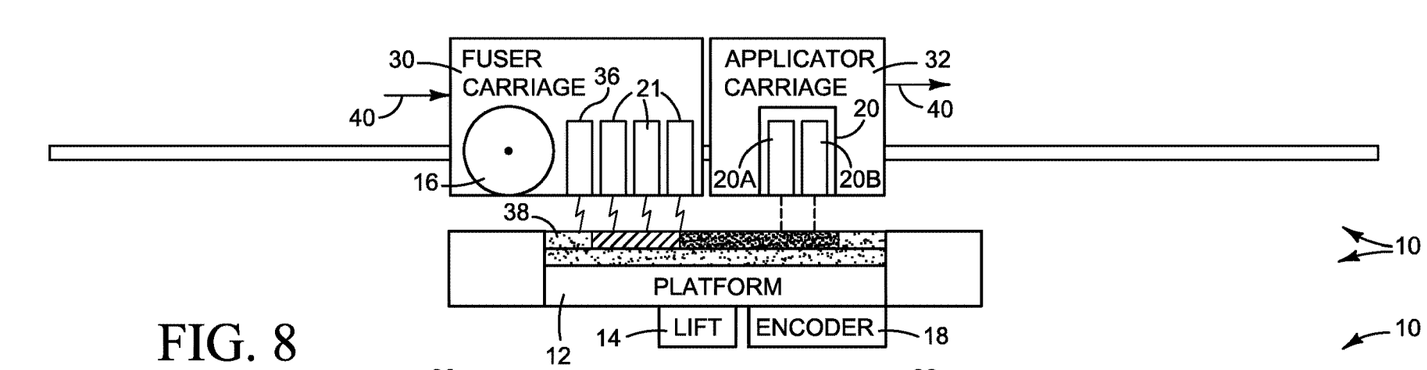
Figure 9:
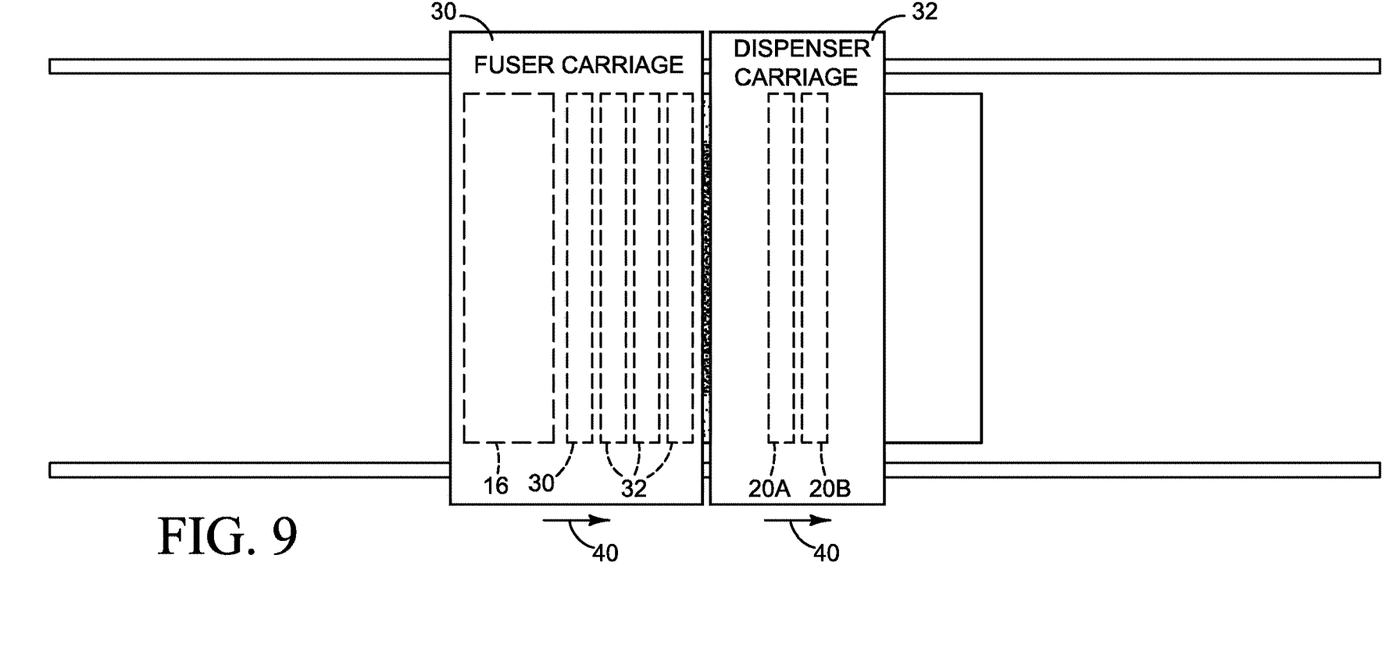
Figure 10:
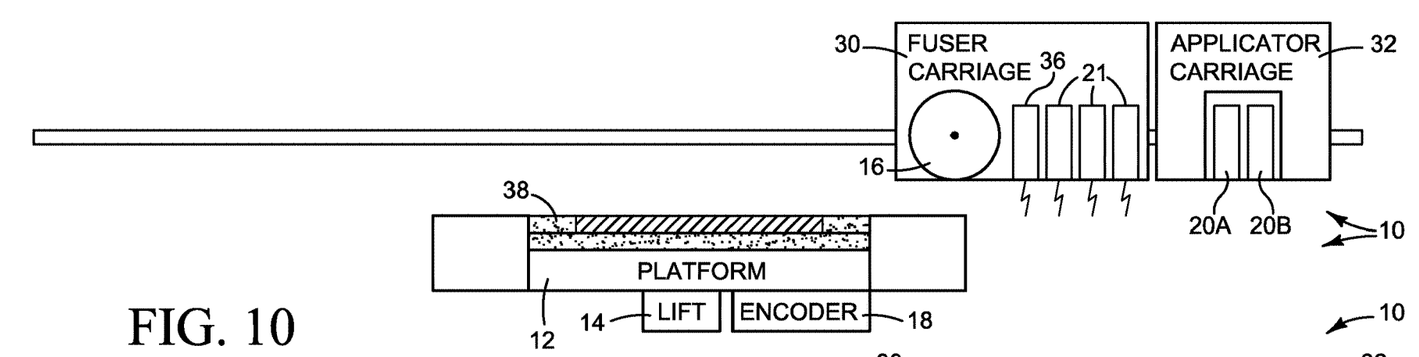
Figure 11:
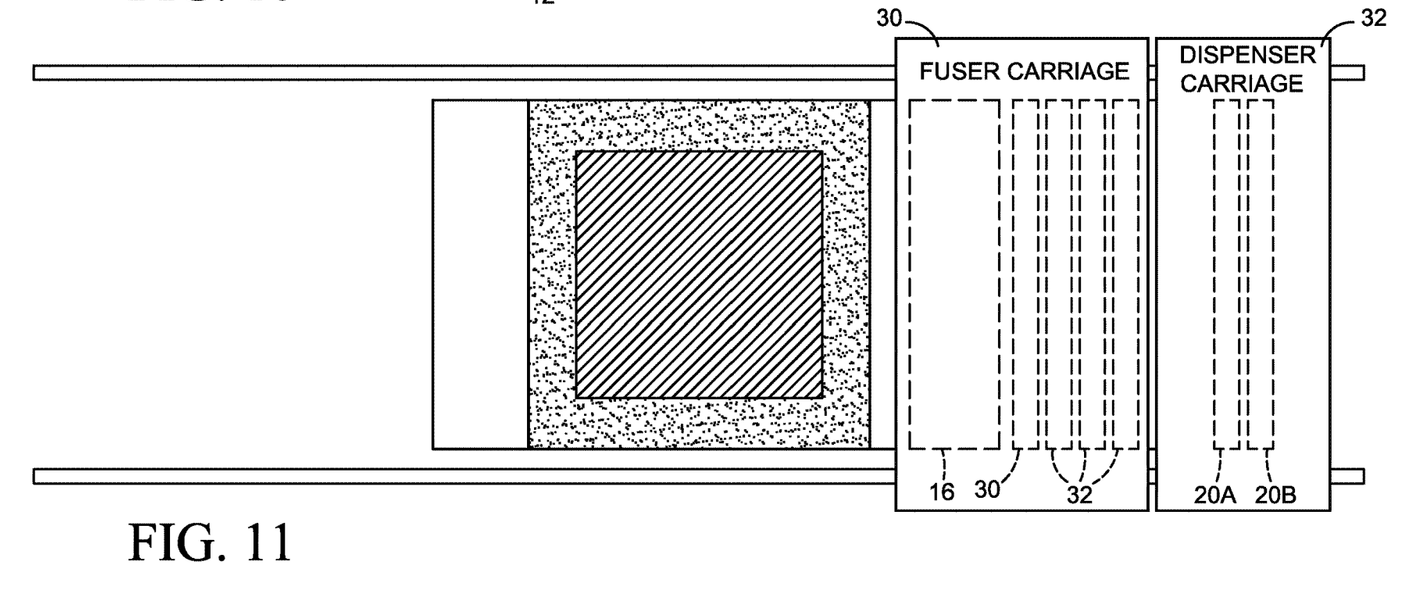

In FIGS. 8 and 9, carriages 30, 32 are moving back to the right with applicator 20 continuing to apply fusing and detailing agents in the determined amounts, followed by lamps 21 irradiating build material with fusing energy to fuse build material treated with fusing agent. Fused build material is depicted by hatching in the figures. In FIGS. 10 and 11, carriages 30, 32 have reached the right side of platform 12. In this example, fuser carriage 30 returns to the left side of platform 12 in preparation for the next layer, as shown in FIGS. 12 and 13, and the sequence of operations may continue for each succeeding layer of build material, slice by slice, to complete the object.

FIGS. 2-13 illustrate just one example of an additive manufacturing machine 10 and manufacturing process. Other suitable machines and processes are possible.

Figure 15:
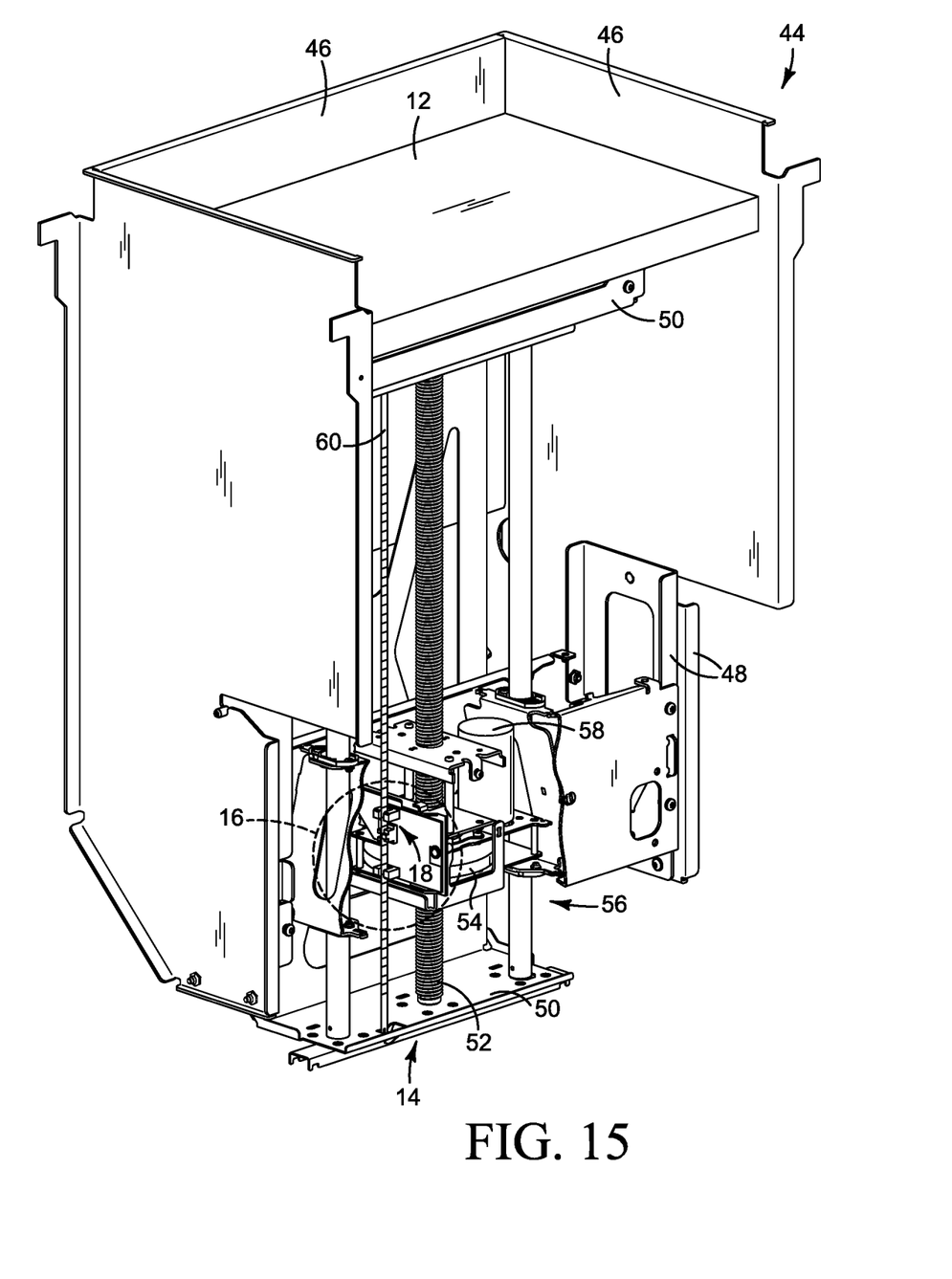
FIG. 15 illustrates one example of a platform lift and encoder such as might be implemented in an additive manufacturing machine shown in FIGS. 2-13.
Figure 16:
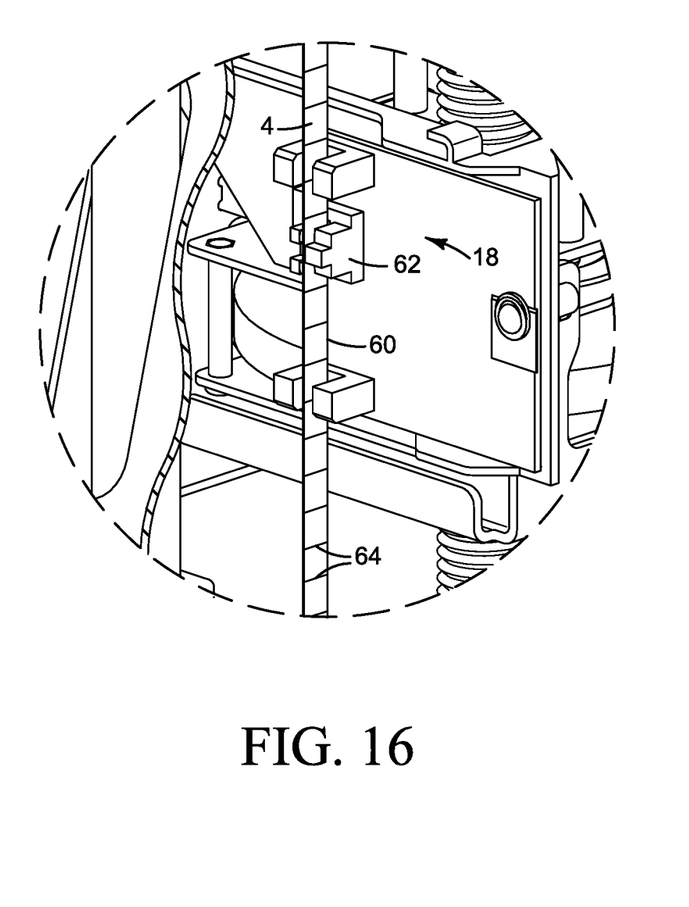
FIG. 16 is a detail view from FIG. 15.

FIGS. 15 and 16 illustrate one example of a build unit 44 with a platform 12, lift 14, and encoder 18 such as might be implemented in machine 10 show in FIGS. 2-13. Referring to FIG. 15, build unit 44 includes a platform 12 connected to a lift 14, and a container 46 surrounding platform 12 to contain build material on platform 12 during manufacturing. Container 46 is affixed to or integrated into a stationary chassis 48 that supports the lift components in the additive manufacturing machine. The front panel of container 46 and chassis 48 are omitted to show parts that would otherwise be hidden from view. Platform 12 sits atop a frame 50 that moves up and down with a leadscrew 52 relative to chassis 48. Leadscrew 52 (and thus frame 50 and platform 12) is lowered and raised through a drive nut 54 suspended from chassis 48 in a drive assembly 56. Drive assembly 56 includes a motor 58 to turn nut 54.

In operation, motor 58 is energized at the direction of controller 22 (FIG. 2) to turn nut 54 incrementally and drive leadscrew 52 carrying platform 12 a nominal distance down for the next layer of build material. A linear encoder 18 includes an encoder strip 60 that moves up and down with frame 50, and thus platform 12 attached to frame 50. An optical reader 62 mounted to chassis 48 reads scaled markings 64 on strip 60 to measure the actual displacement of platform 12. In another example, an encoder 18 includes a magnetic reader to read a magnetic scale on the strip. An encoder 18 is just one example measuring device 18 to measure the distance platform 12 is lowered. Other suitable measuring devices may be used.

Figure 17:
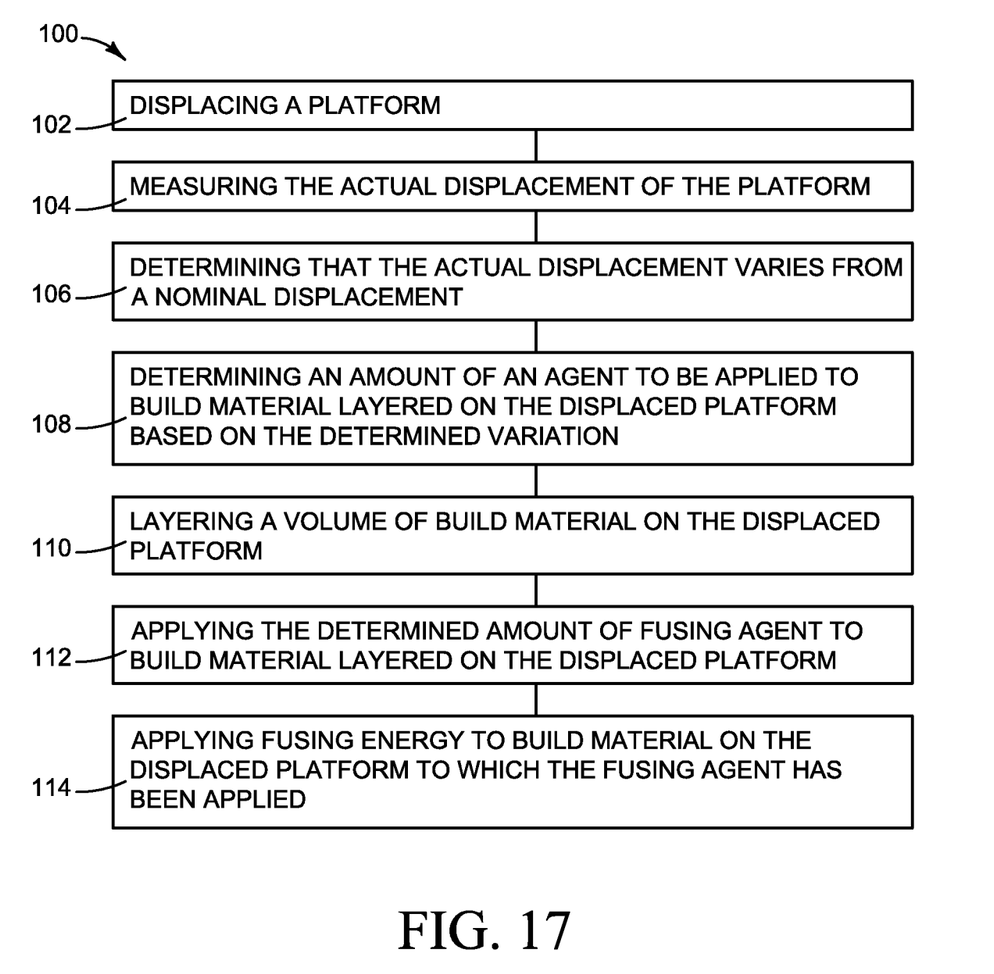
FIG. 17 is a flow diagram illustrating one example of a control process for additive manufacturing.

FIG. 17 is a flow diagram illustrating one example of a control process 100 for additive manufacturing. Process 100 may be implemented, for example, by an additive manufacturing machine controller 22 executing agent control instructions 26 on a machine 10 in FIGS. 1 and 2-13. Referring to FIG. 17, control process 100 includes displacing a platform (block 102), measuring the actual displacement of the platform (block 104), determining that the actual displacement varies from a nominal displacement (block 106), and determining an amount of an agent to be applied to build material layered on the displaced platform based on the determined variation (block 108). In one example, determining the amount of agent to be applied at block 108 includes changing the amount of agent from a nominal amount for each unit volume of build material to which the agent is to be applied to an adjusted amount for each of unit of volume to which the agent is to be applied. Process 100 also includes layering a volume of build material on the displaced platform (block 110), applying the determined amount of fusing agent to build material layered on the displaced platform (block 112), and applying fusing energy to build material on the displaced platform to which the fusing agent has been applied (block 114).

As noted at the beginning of this Description, the examples shown in the figures and described above illustrate but do not limit the scope of the patent, which is defined in the following Claims.

"A" and "an" as used in the Claims means one or more.

The invention claimed is:

1. An additive manufacturing machine, comprising:
a lowering device to lower a platform incrementally to accommodate a succession of layers of a build material;
a layering device to layer the build material on to the platform;
a measuring device to measure an actual distance the platform is lowered;
an applicator to selectively apply an agent to the build material on the platform; and
a controller programmed to:
instruct the lowering device to lower the platform a nominal distance;
determine from the measuring device the actual distance the platform is lowered;
instruct the layering device to layer the build material on to the lowered platform; and
instruct the applicator to apply the agent to the build material on the platform in an amount corresponding to the actual distance measured by the measuring device.

2. The machine of claim 1, where the agent comprises a fusing agent.

3. The machine of claim 1, where the controller is programmed to repeat the instructing, the determining, the instructing, and the instructing for each of multiple successive layers of the build material.

4. The machine of claim 1, where the measuring device comprises a linear encoder including a strip with a scale thereon to indicate a vertical position of the platform and a reader to read the scale.

5. A memory having instructions thereon that when executed cause an additive manufacturing machine to apply an amount of an agent to each of multiple successive layers of a build material to keep the amount of agent applied per unit volume of the build material constant for each of the layers of the build material, including instructions that when executed cause the additive manufacturing machine to, for each of the multiple successive layer of the build material:
displace a platform;
determine an actual displacement of the platform;
determine the amount of the agent to be applied to the build material layered on the displaced platform based on the actual displacement;
instruct a layering device of the additive manufacturing machine to layer the build material on the displaced platform; and
instruct an applicator of the additive manufacturing machine to apply the determined amount of the agent to the build material layered on the displaced platform.

6. The memory of claim 5, where the instructions to determine the amount of the agent include instructions to change the amount of the agent from a nominal amount for each unit volume of the build material to which the agent is to be applied to an adjusted amount for each unit of volume to which the agent is to be applied.

7. The memory of claim 6, where the instructions to change the amount of the agent include instructions to change the amount of the agent for each unit of volume 1.2 to 1.3 times a percentage difference between the actual displacement of the platform and a nominal displacement of the platform.

8. An additive manufacturing machine controller implementing the memory of claim 5.

9. A control process for an additive manufacturing machine, comprising:
displacing a platform;
measuring an actual displacement of the platform;
determining that the actual displacement varies from a nominal displacement;
layering a volume of a build material on the displaced platform;
determining an amount of an a fusing agent to be applied to the volume of the build material layered on the displaced platform based on the determined actual displacement variation;
instructing an applicator to apply the determined amount of the fusing agent to the volume of the build material layered on the displaced platform; and
instructing an energy source to apply fusing energy to the volume of the build material on the displaced platform to which the fusing agent has been applied.

10. The process of claim 9, where the determining of the amount of the fusing agent to be applied includes changing the amount of the fusing agent from a nominal amount for each unit volume of the build material to which the fusing agent is to be applied to an adjusted amount for each unit of volume of the build material to which the agent is to be applied.

11. The process of claim 10, where the changing of the amount of the fusing agent comprises changing the amount of the fusing agent for each unit of volume 1.2 to 1.3 times a percentage difference between the actual displacement of the platform and the nominal displacement of the platform.

12. The process of claim 9, comprising repeating the displacing, the measuring, the determining, the determining, the layering, the instructing and the instructing for multiple successive platform displacements.

\* \* \* \* \*